Nov. 3, 1970  C. N. SMITH  3,537,197

LEVER OPERATED DISPLAY DEVICE

Filed Jan. 23, 1969  6 Sheets-Sheet 1

INVENTOR.
CHARLES NORMAN SMITH.
BY Wastell & Hanley

Nov. 3, 1970 C. N. SMITH 3,537,197
LEVER OPERATED DISPLAY DEVICE
Filed Jan. 23, 1969 6 Sheets-Sheet 2

INVENTOR.
CHARLES NORMAN SMITH
BY Westell & Hanley

Nov. 3, 1970 C. N. SMITH 3,537,197
LEVER OPERATED DISPLAY DEVICE
Filed Jan. 23, 1969 6 Sheets-Sheet 4

INVENTOR.
CHARLES NORMAN SMITH.
BY Westell & Hanley

Nov. 3, 1970   C. N. SMITH   3,537,197
LEVER OPERATED DISPLAY DEVICE
Filed Jan. 23, 1969   6 Sheets-Sheet 5

INVENTOR:

CHARLES NORMAN SMITH

BY: *Westell & Hanley*

Nov. 3, 1970    C. N. SMITH    3,537,197
LEVER OPERATED DISPLAY DEVICE
Filed Jan. 23, 1969    6 Sheets-Sheet 6

INVENTOR:

CHARLES NORMAN SMITH

BY: *Westell & Hanley*

United States Patent Office 3,537,197
Patented Nov. 3, 1970

3,537,197
LEVER OPERATED DISPLAY DEVICE
Charles Norman Smith, Cooksville, Ontario, Canada, assignor to Ferranti-Packard Limited, Toronto, Ontario, Canada
Filed Jan. 23, 1969, Ser. No. 793,401
Int. Cl. G09f 11/00
U.S. Cl. 40—28
21 Claims

ABSTRACT OF THE DISCLOSURE

A pivoted lever mounts display elements projecting approximately perpendicularly to the line joining the lever-display junction to the pivot point. Electromagnetic actuation reversibly moves the lever from a position where the element is occluded to a position where the element is displayed in the viewing direction. Placing the display element on a longer radius from the lever pivot and a lever-mounted magnet (used for actuation of the lever from one position to the other) on a shorter radius from the lever pivot, allows the display element to move to produce the desired display effects with a small magnet travel, providing better magnetic control. Recessing potentially overlapping display elements provides more compact and visually satisfying display modules.

---

This invention relates to display or indicating devices where one or more mechanically movable elements are locatable in either an exposed and a retracted position, and create in such different position, a different optical effect to a viewer in a viewing direction depending on their respective positions. In some cases, each individual element has its own information function. In other cases a group of such elements are controlled to create various combinations of the possible arrangements of elements individually in either their exposed or their retracted position.

The types of device forming the prior art are exemplified by such arrangements as those shown in U.S. Pat. 3,140,553, issued July 14, 1964 to Ferranti Limited, and U.S. Pat. 3,365,824, which issued Jan. 30, 1968 to Ferranti-Packard Electric Limited. In these devices one or more rotably mounted electromagnetically actuable elements is rotatable through angles varying between 90 and 180° about an axis very closely located to two display surfaces on each element which elements are designed to give contrasting visual effects, whereby information may be conveyed on a pattern (including digits and letters) by the combinations of selected ones of the contrasting effects of individual elements. Although the devices disclosed in the prior applications and patents have been extremely successful, some disadvantages have been encountered. These include the fact that, due to the mounting and degree of rotation required of the elements, the elements cannot be placed close enough to provide a contiguous visual appearance between adjacent elements when required. Thus pictures, letters and digits portrayed by the elements of the prior devices were interrupted by gaps which provided gaps or "dead spaces" in a pattern or symbol which, visually, it would have been desirable to portray as continuous. Because of the gaps necessarily existing with prior art devices, there must be unchanging areas or "dead spaces" in the viewing direction between the visual elements, so that the working display area is only a fraction of the total area encompassed, in the viewing direction, by the elements.

A second disadvantage of the prior art constructions is that, since a 90–180° rotation of the elements was required, disadvantages in the electromagnetic actuation were encountered since the common method, disclosed in the above patents and applications, is to mount a magnet on the element with its magnetic axis transverse to the element pivotal axis and to actuate the magnet by an exterior, reversible magnetic field to assume its two positions. Since maximum torque is encountered when the two fields are mutually perpendicular, lower torques are encountered toward ends of a 90° or 180° movement range; and of course where the fields are parallel, at each end of a 180° movement range, the torque would be zero. Thus, in order to obtain sufficient starting torques for moving the elements, special techniques have been necessary and, special and more expensive designs have been required where the movement is less than 180°. Further, the location of the axis near the centre of the display element has meant that, due to the rotations required, the depth required by the mechanism at the display area of the device must be enlarged to approximately one-half the width of the element transverse to the pivotal axis, creating parallax viewing effects which decrease the effectiveness of the sign display, and make a more cumbersome device.

This invention provides, for a display or indicating device, a thin display element, mounted on a movable arm and arranged so that the thin display element is joined substantially at an edge to a pivotally mounted arm with the thin element projecting from the arm approximately perpendicular to a radius from the pivotal axis to the junction of arm and thin element. A frame preferably defines a viewing area, and a viewing direction relative thereto where a surface of the thin element is displayed in an exposed position of said element; while a recess is provided to receive the element and occlude it in the viewing direction, when the thin element is in a retracted position. The viewing surface of the thin element is, on the operative portion, covered with a surface optically distinct from the portion of the viewing area it occludes in its exposed position.

It will be noted and will be more obvious hereafter, that with the inventive arrangements, adjacent elements may overlap in their exposed position and be independently movable into and out of the viewing or display area. Due to this permitted overlap in many arrangements, undesired gaps or areas in the design or symbol being portrayed may be eliminated and in other arrangements considerably reduced in comparison with the prior art. It should also be noted that the length of the arm between the pivot point and the display element, results to a degree varying with the arm length in a reduction of the angular displacement of the arm required to move the element from its exposed to its retracted position. The angular movement required between the retracted and the exposed position is much less than the 90–180° required with prior art devices. For example where the thin element is $\frac{3}{32}''$ across in its reciprocal movement direction, and where the length from the thin element to the pivotal axis is $\frac{5}{16}''$ the necessary angle of travel from exposed to occluded position for the element will be only approximately 20°. Thus it will be seen that, in designs where the actuation is electromagnetic then due to the small angular displacement and travel, good magnetic torque conditions exist in all loci of movement. Thirdly it will be noted that the thin element moves with its smallest (thickness) dimension approximately parallel to the viewing direction at and near its exposed position. Thus the depth required for the mechanism at the display area need, with the inventive design, encompass only the thickness of the thin element, the thickness of an occluding member for the thin element in its retracted position and the necessary clearances. (The major portion of the length of the arm and the magnetic element may, by easy geometrical arrangement, be removed from the display area.) Thus the depth of the display area is independent of the optically effective areas of individual elements, and hence for given dimensions of the latter, this area "depth" may be made much smaller than the comparable depths of devices of the prior art.

It will be noted that inventive features, other than those heretofore discussed, will be described against the background of the specific embodiment hereinafter disclosed.

Figure 1:
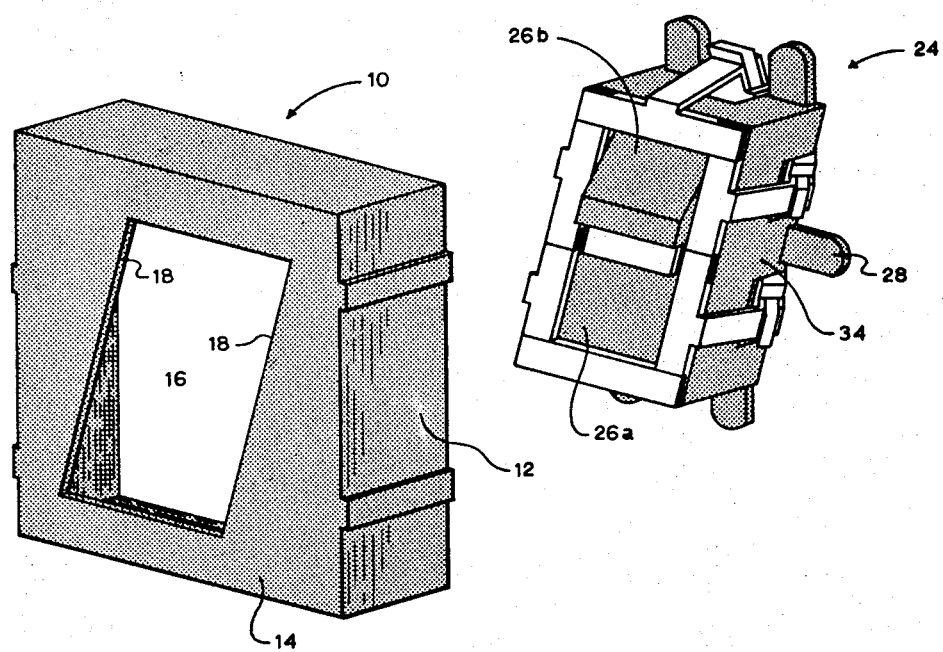
FIGS. 1 and 2 are exploded perspective views of the front and the back of a device in accord with the invention.
Figure 2:
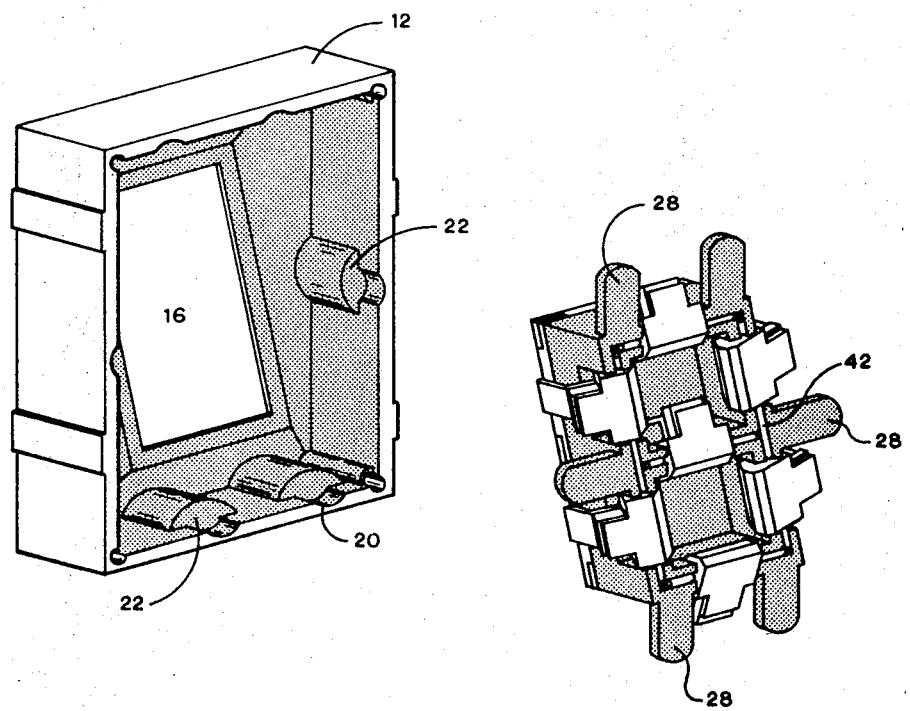
Figure 3:
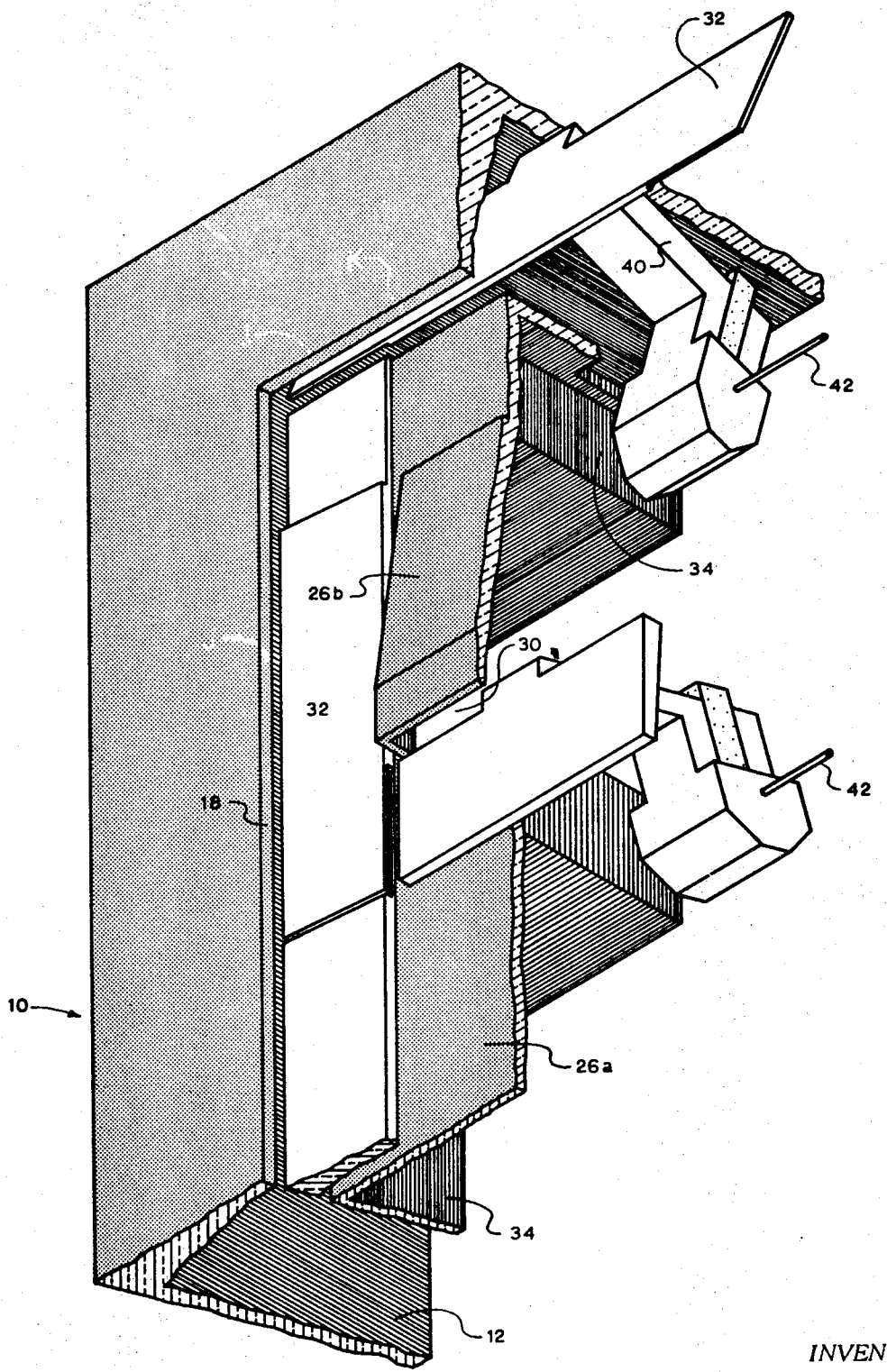
FIG. 3 is an enlarged view of portions of the device of FIG. 1.

In FIGS. 1, 2 and 3 there is shown a frame 10 (preferably of plastic), rearwardly opening and, having side walls 12 and front walls 14, the latter having edges 18, defining a parallelogram shaped aperture 16, having in the intended operation of the device a greater height than width. It will be obvious hereafter, that the viewing aperture may be rectangular or square or any other shape. However for the type of device contemplated in FIGS. 4-6 for indicating decimal digits, the sloping parallelogram arrangement shown is preferred.

The direction from which the maximum area of the aparture is seen is considered the viewing direction and the terms "rearwardly" and "forwardly" are used for directions parallel to the viewing direction with "rearwardly" corresponding to the direction that the side housing walls 12 extend from the front face and "forwardly" referring to the opposite direction. The front walls 14 of the housing are made thin in the viewing direction at and near the aperture defining edges 18. From the rearward edge of each of the opposite housing side walls, is provided at least one forwardly extending, downwardly extending groove 20 (here six are shown) for a purpose to be hereinafter discussed. At the forward ends of the grooves 20 the frame material is molded to provide rearwardly facing shoulders 22.

A mounting member 24, preferably of plastic, is provided for assembly with the housing having a forward wall composed of walls 26A and 26B similar in shape to the viewing aperture and of approximately the same size and side walls 34 extending rearwardly therefrom relative to the intended mounting orientation of the members 24.

The rear of the mounting member is provided with sidewise projecting tabs 28 to locate and removably fix (preferably by friction and the resiliency of the tabs 28) the mounting member in the housing with tabs 28 bearing on shoulders 22. The location and depth of the grooves 20 is therefore arranged to locate the mounting member forward wall 26A–26B acting as a display surface in substantial registration with the housing aperture in the viewing direction and spaced rearwardly from the rearward surface of the forward wall 14 to allow adjacent each edge of the aperture, the approximately edgewise passage of a thin member 32 therebetween, from an occluded position behind the housing forward wall 14 to an exposed position forwardly of the mounting member forward wall 26 (compare FIGS. 9 and 10 or FIGS. 7 and 8).

The forward wall of the mounting member is also louvered, to provide a slot 30 transverse to the viewing direction and parallel to the short sides of the parallelogram (here downwardly opening), between walls 26A and 26B, substantially just meeting in the viewing direction, but spaced in the viewing direction to allow the passage of a thin member 32 from a position behind the forwardly disposed one of said meeting walls to a position just forwardly of the rearwardly disposed one of said meeting walls. The walls are so disposed that a thin member 32 passing between said meeting walls and then located in exposed position, is approximately centrally disposed in the viewing area.

The rearwardly extending side walls 12 of the mounting member are indented forwardly to allow pivotal mounting of arms 40 for each of the thin members 32. The thin members 32 are mounted on arms 40 to extend approximately perpendicular to the radius from the pivot axis to the junction of arm 40 and thin member 32. The pivotal mounting preferably comprises pins 42 frictionally fitted in grooves the rearward edge of walls 34. The mounting and geometry of arm 40 is such that each thin element 32 is movable as illustrated best in FIGS. 9 and 10 or in FIGS. 7 and 8, between a position exposed in the viewing area and an occluded position. The forwardly-facing surface of each thin member 32 is made optically contrasting with the surface of wall 26A or 26B visible in the viewing area, whereby the presence or not of a thin element in the viewing area determines the appearance therein. In the specific embodiment, the walls 26A and 26B and the frame forward wall 14 are black and the forward facing surface of the wall 14 is white. It will be appreciated, however, that the optical contrast may be achieved in any other manner suitable to the purposes of a particular application.

In the specific embodiment shown, two longitudinally extending thin elements 32 are mounted so that in their exposed position they are disposed in end to end overlapping relationship, and are bordering the edge of each of the long sides of the parallelogram, and longitudinally disposed element 32 is provided to define, in its exposed position, an upper and a lower border for the parallelogram, while a seventh longitudinally extending thin element is dimensioned to pass through the slot 30, and in its exposed position to be approximately half way between and approximately parallel to the upper and lower bordering members.

The thin display elements 32 here of longitudinally extending form, are each shaped to extend longitudinally parallel to their mounting pin 42. The thin elements 32 are dimensioned to pass edgewise through the slot defined by the adjacent housing and mounting member walls (or in the case of the central thin element through the passage in the meeting mounting member walls 26A and 26B) on swingable movement on the respective arm 40.

Figure 7:
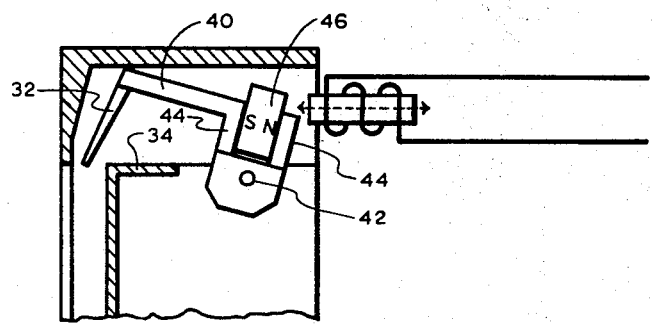
FIGS. 7 and 8 illustrate one means of magnetic actuation of the movable display elements.
Figure 8:
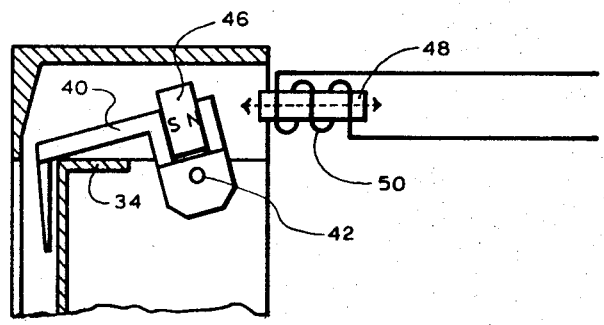
Figure 9:
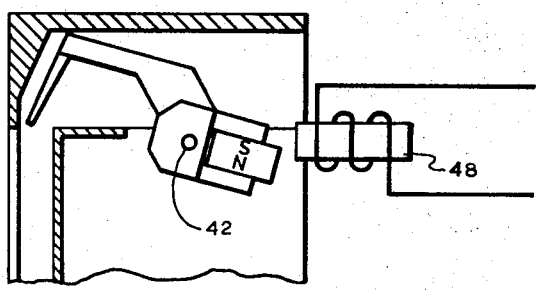
FIGS. 9 and 10 illustrate an alternative means of magnetic actuation of the movable display elements.

In accord with the invention stop means of any desirable form are used to limit movement of the thin element 32 and arm 40 to set its limits at the exposed and occluded positions. The stop means may be provided in any desired manner, but the method presently preferred uses the contact of the arm 40 with the front edge of wall 26 as the limit of element movement toward the exposed position (FIG. 8 or 10) and uses the housing side wall to act as the stop for the radially outward end of the arm 40 in the occluded position (FIGS. 7 or 9). Similarly acting stops (not shown) are provided on the upper edge of wall 26A and behind wall 26B to provide the exposed and occluded limits, respectively of the central member.

Figure 4:
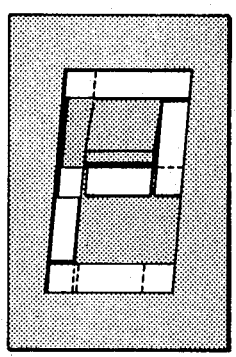
FIGS. 4–6 are views showing the display devices produced thereby.
Figure 5:
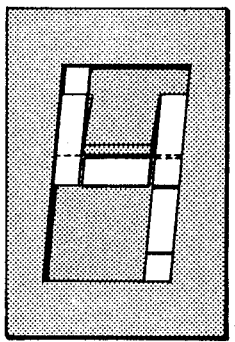
Figure 6:
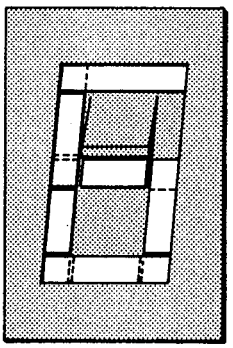

The seven bar module, as discussed, and shown, may, by individual control of element positions, operate to obtain the required combinations of element positions, and the digits from 0 to 9 be produced. FIGS. 4–6 illustrate the combinations of digits used to produce the digits 2, 4 and 6. The device described and shown may be considered as a modular unit, and thus as many of these may be combined as desired to provide a desired digital array.

Elements are overlapped where continuity of appearance is desired or where it is desired for the purposes of the design to have part of the space vacated by one element moved to the occluded position filled by an otherwise overlapping element. Since the thin elements move substantially edgewise and parallel to each other when near their overlapping relationship, the overlap may easily be obtained without undue thickness of the display by recessing the overlapping portion of a thin member on the surface and to the extent of the overlap as illustrated.

Before discussing the magnetic actuation of the elements it should be realized that the thin elements may be of any disposition or shapes, within the scope of the invention. For example, the elements of longitudinal slope, like those described, may be used in different shapes to selectively produce letters or other indicia instead of numbers. Moreover the elements instead of being longitudinally extending may be circular, square or any other shape and may, on the one hand individually define information in a binary manner or, on the other hand, may be used in a large array to produce a pattern or design instead of digits or letters. In all these arrangements, the advantages of no dead space and shallow pattern depth will accrue and the advantages of the development for magnetic actuation will also accrue for these alternatives.

Two means for electromagnetic actuation of the element will be shown. In FIGS. 7 and 8 is shown the method corresponding to the developments shown in FIGS. 1-6. In FIGS. 7 and 8 the element is shown at its respective occluded and exposed travel limits. A magnet 46 is frictionally held between two ears 44, projecting from the arm but could be otherwise clamped or held by a set-screw if necessary so that its north-south axis is as shown substantially parallel to the viewing direction in the intermediate position of the member. (The criterion for orientation is however in this alternative to have the movable magnetic axis parallel to the exterior magnetic field at the intermediate point of its movement.) Thus the element may be actuated to its two limiting positions by selectively providing a reversible electromagnetic field which is approximately parallel to the field of magnet 46 intermediate the two limiting positions. It will be noted that the travel of the moving magnet need not be equally on either side of the position where the fields are parallel but this arrangement gives best overall operation. The means of selectively producing exterior magnetic fields is not shown in detail since many alternatives are available and these are well within the knowledge of those skilled in the art. However the preferred method is to use a core 48 having reversible permanently magnetizable material and an energizing winding 50 therearound. Such a core may be magnetized in one polarity by a pulse on the winding and is designed to remain in that polarity and arrangement until pulsed in the opposite sense. The core material is selected so that the residual magnetic field of the core between pulses is sufficient to maintain the thin element, arm and movable magnet in the selected limiting position between pulses.

In the embodiment of FIGS. 7 and 8, the magnetic force moving the moving element is attraction or repulsion and is a maximum at its nearest travel to the electromagnet and its minimum at the farthest separation. Due to the arrangement of the thin element 32 on a relatively long radius from the pivotal axis 42, and the magnet, located on a relatively short radius from axis 42, the necessary travel for the element 32 from occluded to exposed position, involves a very small angular movement of arm 40 and a very small travel of the magnet 46. Because of this short travel the exterior field and magnet may be arranged so that good magnetic torque conditions ensue through the whole of the locus of movement of the element 46. Thus, as indicated in the drawings, the radius from the pivot axis 42 to the element, can be twice and preferably more than twice the radius perpendicular to the mean location of the movable element magnetic field. Because of the good torque conditions existing, the inventive device lends itself to fast switching and certain operation.

In operation, the energization of the exterior core 48 to place its "North" magnetic pole toward the magnet 46 repels the latter moving the arm and element 32 to the exposed position. The residual force of the magnet is preferably designed to maintain the element in this position without continuing coil energization.

The opposite energization of the core 48 will attract magnet 46 and move arm 40 and element 32 to their exposed positions. Here, again, the residual force of the magnet is preferably designed to maintain the element in this position in the absence of continuing energizing current. A core will be provided and located to control each element 32 in a module or array and the cores and energizing windings will preferably be arrayed and mounted in a back up mounting where the modules as described may be located with the individual magnets 46 in proximity to and influenced by their respective cores.

Figure 10:
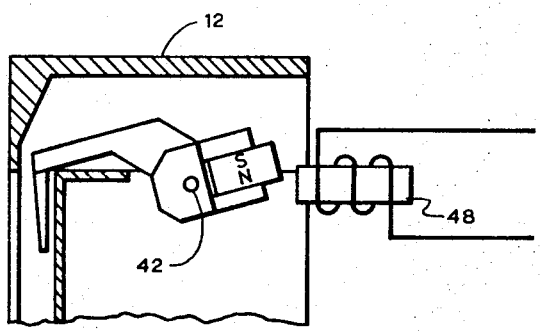

In FIGS. 9 and 10 are shown an alternate method of magnetic actuation. Here, the exterior core 48 and energizing winding 50 are arranged as before, but the movable element magnet 46 is frictionally mounted on ears 52 projecting from arm 40 in a direction so that halfway along its locus of movement and the magnetic axis of core 48 is perpendicular to that of magnet 46 in the intermediate position of the latter. This is the location, with this arrangement, for maximum torque in either sense, depending on the sense of magnetization given to the core 48. As previously discussed, with the approximately 20° range required, strong torque conditions in either sense are available through all parts of the locus of movement of magnet 46. Pulse actuation may be used as before.

It should here be noted that the elements as shown and with pulse or other operation are equally operable by an electromagnetic core 46 about vertical or horizontal axes 42. Thus the effects of gravitation on the unbalanced arm shown are not sufficient to interfere with the movement of the element or to cause the element to move out of a gravitationally unstable limiting position against the magnetic force. However if desired the arm, magnet and element may be arranged to be substantially balanced relative to the pivot point over the arc of movement. There are many ways in which this may be accomplished, FIGS. 9 and 10 showing an arm more nearly balanced than the arm of FIGS. 7 and 8.

I claim:

1. A display or indicating device comprising:
   a frame;
   a viewing direction defined relative to said frame;
   an arm pivotally mounted thereon;
   a thin member mounted adjacent the radially outward end of said arm with its thin dimension approximately radially oriented relative to said pivotal axis;
   said thin member being attached adjacent one edge thereof to said arm; and
   projecting therefrom in a general direction perpendicular to said pivotal axis;
   the radially exterior surface of said thin member being designed to give a predetermined optical indication;
   means limiting angular movement of said arm about said pivot axis to a predetermined arc;
   means mounted on said frame having, facing in the viewing direction, a surface optically distinct from said thin member surface designed to occlude said surface in the viewing direction when said arm is at one end of said arc of movement;
   means mounted on said frame, having, facing in the viewing direction, a surface optically distinct from said thin member surface, designed to be occluded by said thin member at the other end of said arc of movement;
   means for moving said element from either limiting position to the other, and means for maintaining said element in either position.

2. A device as claimed in claim 1 wherein said means for moving said element comprises:
   a permanent magnet mounted for movement with said arm;
   means exterior to said arm, to provide alternatively selectable magnetic fields, respectively located and disposed in relation to the positions of said permanent magnet, to respectively move said arm to one or the other of said limiting positions.

3. A device as claimed in claim 2 wherein said means for producing an exterior magnetic field comprises a permanently magnetizable pole piece located and oriented in relation to said movable magnetic member so that, magnetization of said permanently magnetizable pole piece in one sense, will move said arm to one limiting position and magnetization of said permanently magnetizable pole piece in the other sense will move said arm to the other limiting position.

4. A display or indicating device having an intended viewing direction with respect thereto, comprising:
   pair of members on said frame, each having a surface facing in said viewing direction;
   said members being spaced in the viewing direction by a slot facing transverse to the viewing direction;
   said members being so disposed in relation to one another, that said surfaces cover adjacent areas in said viewing direction, whereby, in relation to said viewing direction, a thin member moving in one direction through said slot may move from a position occluded by one of said members to a position occluding a portion of the other of said members;
   an arm swingably mounted in relation to said frame;
   a thin member mounted on said arm, oriented and dimensioned to pass reciprocally through said slot, on swingable movement of said arm;
   said member having a surface facing in the viewing direction, when extending through said slot, and designed to have an area optically distinct from said portion of said other surface;
   means limiting movement of said arm between a limiting position where said member projects outwardly through said slot to occlude, in said viewing direction, said portion of said other surface, and a limiting position where said one of said members occludes said optically distinct area.

5. A device as claimed in claim 4 combined with means for selectively locating said arm in said two limiting positions and moving said arm therebetween.

6. A device as claimed in claim 5 wherein said means for moving said element comprises:
   a permanent magnet mounted for movement with said arm,
   means for providing, exterior to said arm, alternatively selectable magnetic fields located and disposed in relation to the positions of said permanent magnet, to respectively move said arm to one or to the other of said limiting positions.

7. A device as claimed in claim 6 wherein said means for producing an exterior magnetic field comprises a permanently magnetizable pole piece located and oriented in relation to said movable magnetic member so that, magnetization of said permanently magnetizable pole piece in one sense will move said arm to one limiting position and magnetization of said permanently magnetizable pole piece in the other sense will move said arm to the other limiting position.

8. In a display or indicating device wherein at least two elements are each designed and arranged to assume one of two physical positions,
   a frame for said elements defining a pattern area for viewing patterns in a predetermined viewing direction;
   said pattern area being designed to provide a predetermined optical appearance in the viewing direction;
   each of said elements being provided with a surface optically contrasting with the appearance of said pattern area;
   said elements being swingably mounted to move between a first position where said optically contrasting surface is exposed in said pattern area and a second position;
   means associated with said frame for occluding each optically contrasting surface in the viewing direction when in said second position.

9. A device as claimed in claim 8 combined with means for selectively locating said arm in said two limiting positions and moving said arm therebetween.

10. A device as claimed in claim 9 wherein said means for moving said element comprises:
    a permanent magnet mounted for movement with said arm,
    means for providing, exterior to said arm, alternatively selectable magnetic fields respectively located and disposed in relation to the positions of said permanent magnet, to move said arm to said respective limiting positions.

11. A device as claimed in claim 10 wherein said means for producing an exterior magnetic field comprises a permanently magnetizable pole piece located and oriented in relation to said movable magnetic member so that, magnetization of said permanently magnetizable pole piece in one sense will move said arm to one limiting position and magnetization of said permanently magnetizable pole piece in the other sense will move said arm to the other limiting position.

12. A device as claimed in claim 8 wherein at least two of said elements are designed so that, when both in said first position, an extent of one of said element contrasting surfaces overlaps the other of said element contrasting surfaces in the viewing direction and where each of said elements is mounted so that it may move between said first and second positions independently of the other.

13. A device as claimed in claim 12, wherein at least one of two overlapping members is arranged so that its surface, facing the other overlapping member, is recessed at the overlapping location.

14. In a display or indicating device, a housing designed in relation to a predetermined viewing direction to provide an aperture facing in the viewing direction, a mounting member detachably attachable to the housing to provide a surface of a predetermined optical quality facing in the viewing direction, and, located to register with said aperture when viewed in the viewing direction, said housing and mounting members being designed, so that, when attached, said surfaces are displaced from one another in the viewing direction,
    said members being designed so that, in at least one location, a recess is provided on the rearward side of the forward member, surface, so that a thin member may move between such recess and into the aperture forwardly of the rearwardly located member,
    such thin member being swingably mounted,
    such thin member being provided, on a surface facing said viewing direction with at least a portion of such surface of a differing optical quality from said mounting member surface with said portion being located to be displayed in said viewing direction when said thin member is located in said aperture.

15. A device as claimed in claim 14 wherein said housing surface is located forwardly of said mounting member surface in the viewing direction and said housing member is recessed to receive a thin member moving from a position forward of a portion of said mounting member surface to a position rearward of said housing surface.

16. A device as claimed in claim 15 wherein said thin member is mounted on an arm pivotally mounted on said mounting member, said arm and pivot mounting being arranged so that said thin member extends from said arm approximately perpendicular to a radius from said pivot mounting passing through the junction of said arm and said thin member, and in the direction from said recess toward said aperture.

17. A device as claimed in claim 16 combined with means for selectively locating said arm in said two limiting positions and moving said arm therebetween.

18. A device as claimed in claim 17 wherein said means for selectively locating element comprises:
- a permanent magnet mounted for movement with said arm,
- means for providing, exterior to said arm, alternatively selectable magnetic fields respectively located and disposed in relation to the positions of said permanent magnet, to selectively locate said arm in said respective limiting positions.

19. A device as claimed in claim 18 wherein said means for producing an exterior magnetic field comprises a permanently magnetizable pole piece located and oriented in relation to said movable magnetic member so that, magnetization of said permanently magnetizable pole piece in one sense will move said arm to one limiting position and magnetization of said permanently magnetizable pole piece in the other sense will move said arm to the other limiting position.

20. A device as claimed in claim 16 wherein said aperture is substantially a parallelogram and is defined to have opposite short and opposite long sides, each perpendicular to the viewing direction, wherein said thin members define a longitudinally extending member parallel to their respective arms mounting axes, and six of such thin members are located and mounted, so that in the exposed position of said respective members in the aperture, on each of the long sides, two of such thin members substantially together define an optical contrasting border on each side of said aperture, and on each of the short sides, a thin member substantially defines an optically contrasting border, said mounting member being provided with a seventh thin member movable from a retracted position to a position approximately intermediate and parallel to said short side bordering thin members, said mounting member being designed to provide a recess for said seventh thin member wherein, in its retracted position its optically contrasting surface is occluded in the viewing direction and wherein clearance is provided for said seventh thin member to move to said approximately intermediate position and to be there exposed in the viewing direction.

21. A magnetically actuable display element located to extend from a pivotally mounted arm in a direction approximately perpendicular to a radius from the pivotal axis to the junction of the display element and the arm and a magnet also mounted on said arm where the length of the perpendicular to its mean magnetic axis is less than half the distance from said pivotal axis to the said element.

References Cited

UNITED STATES PATENTS

| | | | |
|---|---|---|---|
| 1,799,731 | 4/1931 | Cassels | 40—28 |
| 3,096,594 | 7/1963 | Skrobisch | 40—28 |
| 3,267,595 | 8/1966 | Levy et al. | 40—52 |
| 3,295,238 | 1/1967 | Winrow | 40—52 |

EUGENE R. CAPOZIO, Primary Examiner

W. J. CONTRERAS, Assistant Examiner

U.S. Cl. X.R.

40—52